United States Patent [19]

Jacobs

[11] 4,322,505
[45] Mar. 30, 1982

[54] REACTIVE POLYESTER RESIN-PLASTICIZER COMPOSITION

[75] Inventor: Eugene F. Jacobs, Tulsa, Okla.

[73] Assignee: Phillips Petroleum Company, Bartlesville, Okla.

[21] Appl. No.: 198,556

[22] Filed: Oct. 20, 1980

Related U.S. Application Data

[63] Continuation of Ser. No. 923,938, Jul. 13, 1978, abandoned.

[51] Int. Cl.$^3$ .................... C08L 67/06; C08E 265/04
[52] U.S. Cl. ......................................................... 525/44
[58] Field of Search ................ 525/44; 260/31.8 XA, 260/31.4 R

[56] References Cited

U.S. PATENT DOCUMENTS

| | | | |
|---|---|---|---|
| 3,256,226 | 6/1966 | Fekete et al. | 260/23.5 R |
| 3,317,465 | 5/1967 | Doyle et al. | 260/47 |
| 3,345,401 | 10/1967 | May | 260/31.8 A X |
| 3,786,004 | 1/1974 | Furiya et al. | 260/31.8 A X |
| 3,855,160 | 12/1974 | Shiotsu et al. | 260/31.4 R |
| 4,274,992 | 6/1981 | Buechler et al. | 525/48 |
| 4,274,994 | 6/1981 | Riew | 525/44 |

OTHER PUBLICATIONS

New Product Announcement–6/1/1977–CoRezyn VE8520, Interplastic Corporation.

*Primary Examiner*—William F. Hamrock
*Assistant Examiner*—Peter F. Kulkosky

[57] ABSTRACT

A reactive polyester resin composition comprising a polyester resin having ethylenically unsaturated terminal groups, and a reactive, aliphatic plasticizer compatible with the resin and having ethylenically unsaturated terminal groups. By virtue of the terminal ethylenic unsaturation, the composition can be cross-linked with, e.g., styrene to form a tough, flexibilized, corrosion resistant polymer. The high level of corrosion resistance is maintained notwithstanding the impressive degree of flexibility imparted to the composition.

15 Claims, No Drawings

REACTIVE POLYESTER RESIN-PLASTICIZER COMPOSITION

This is a continuation of copending application Ser. No. 923,938, filed July 13, 1978 and now abandoned.

BACKGROUND OF THE INVENTION

Vinyl esters, prepared by the interaction of epoxide resins having terminal epoxide groups with low molecular weight $\alpha, \beta$-unsaturated organic acids, or variants thereof have been widely used in structural applications with glass reinforcement, the latter being commonly in the form of cloth or fibers. In such applications, the glass is impregnated with the resin and holds the resin in place while the resin is cured or hardened. Such compositions have exhibited excellent resistance to corrosion. However, their inherent brittleness frequently makes them generally unfit for use for certain applications, such as for pipe linings. When such compositions are employed in pipe linings, the inner barrier layers of the linings are very rich in the unreinforced resin, and only enough glass or other veil material is included to support the syrupy resin as the latter hardens. Excessive stresses, such as those resulting from accidental impact, improper installation, mechanical fatigue and thermal shock, can cause cracking or crazing of the inner barrier layer, reducing its fitness for its intended function and leading to possible ultimate pipe failure.

SUMMARY OF THE INVENTION

It has now been found that polyester resin, such as the vinyl ester resins described above, can be plasticized by a reactive plasticizer such that the plasticizer is chemically united with the resin upon curing or hardening. The plasticizer imparts flexibility and toughness to the resulting product without unduly affecting corrosion resistance. During the curing or hardening procedure, the polyester resin and the plasticizer each react with itself or with the other or through ethylenically unsaturated monomers such as styrene to provide a tough, corrosion resistant polymeric product ideally suited for fiberglass reinforced plastic articles.

The invention relates to a polyester resin composition, and to a plasticizer used therein. The composition comprises a styrene-compatible polyester resin having reactive, ethylenically unsaturated terminal groups, and a plasticizing amount of an aliphatic plasticizer. The polyester resin may be characterized as the reaction product of a polyepoxide resin and an ethylenically unsaturated preferably monobasic, organic acid such as methacrylic acid. The aliphatic plasticizer is compatible with the polyester resin and with styrene, and may be considered to be the reaction product of an aliphatic epoxide resin having an epoxide equivalency of at least 1.0 with an unsaturated organic acid. The plasticizer desirably has ether linkage groups in its primary hydrocarbon chain, and preferably is of the formula

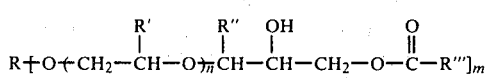

wherein:

R is a polyvalent radical of an aliphatic polyol having the formula

R' and R" individually are H or lower alkyl, preferably methyl,

R'" is the radical of an aliphatic ethylenically unsaturated carboxylic acid having the formula

and having $\alpha, \beta$ unsaturation, m is an integer of from 2 to 4, and n is an integer of from 1 to 15, and preferably from 6 to 10.

The composition may include one or more additional ethylenically unsaturated monomers such as styrene, the composition existing as a single-phase, curable, syrupy material to which fillers or other adjuvants may be added. The composition may be readily cured with known peroxy catalysts to yield a tough, flexibilized, corrosion-resistant polymer containing the plasticizer chemically bonded therein as an integral, nonseparable constituent.

DETAILED DESCRIPTION

The polyester resin employed in the invention has terminal ethylenic unsaturation and is essentially free of epoxide groups. It is desirably derived from an epoxide resin by reaction of the resin with an organic carboxylic acid having $\alpha, \beta$ ethylenic unsaturation. Polyester resins of this type are known to the art, and are described, for example, in U.S. Pat. Nos. 3,317,465, 3,345,401 and 3,256,226, the disclosures of which are incorporated herein by reference. The polyester resin is compatible with styrene monomer; that is, mixtures of the resin and styrene containing at least 10% by weight of styrene exist as clear, single-phase non-separating solutions. The precursor epoxide resins desirably are of the general formula

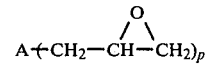

wherein p is at least 2 and preferably is in the range of 2-3, and A is an organic radical derived from a polyhydric phenol by removing the phenolic hydrogen groups. A is preferably

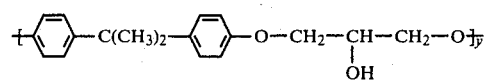

wherein y is an integer of from 1 to 20. The polyepoxide resin desirably has an epoxy equivalent weight ranging from about 170 to about 650, and preferably in the range of about 300 to 650. Epoxy resins of this general type are well known in the art and are available from a variety of commercial sources. The organic carboxylic acid having ethylenic unsaturation is desirably monobasic and is selected from the group which includes such acids as acrylic, methacrylic, crotonic, isocrotonic, cinnamic and the like, and higher alkylated acrylic acids such as ethyl, propyl, and butyl-substituted acrylic acids. Dicarboxylic acids are typified by maleic acid and fumaric acid. It is also possible to employ half-esters formed by esterification of one mole of a hydroxy compound (such as an alcohol) with one mole of an anhydride of an ethylenically unsaturated dicarboxylic acid such as maleic acid anhydride. Speaking broadly, the unsaturated organic acid should have at least one carboxyl group and should further have ethylenic unsaturation so as to provide the precursor epoxide resin with ethylenically unsaturated terminal groups which may participate in addition polymerization reactions with the ethylenically unsaturated groups of such monomers as styrene and with ethylenically unsaturated groups of the plasticizer.

The reactive plasticizer employed in the invention is an aliphatic polymeric material having styrene compatibility (as described above) and having ethylenically unsaturated terminal groups. The plasticizer may be the reaction product of an aliphatic epoxy resin having an epoxide equivalent of at least 1.0 with an unsaturated organic acid such as the acids described above. The plasticizer desirably has ether linkages in its backbone, and is desirably free of unreacted epoxide groups. The plasticizer is preferably of the formula

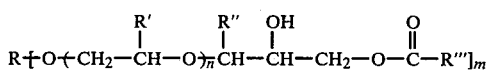

in which R is a polyvalent radical of an aliphatic polyol having the formula R(OH)$_m$, such as glycerol, ethylene glycol, pentaerythritol, propylene glycol, 2-ethylhexanediol, cyclohexanediol, tris (hydroxymethyl) ethane, etc. R' and R" individually are H or lower alkyl, and preferably are individually methyl groups. R''' is the radical of an aliphatic, ethylenically unsaturated carboxylic acid having α, β unsaturation, and having the formula R''' COOH, m is an integer of from 2 to 4, and n is an integer of from 1 to 15, preferably from 6 to 10.

Epoxy resins of the type described in connection with the plasticizer are known to the art, one such resin being "Epoxide 151", a product of the Proctor & Gamble Company. Such resins may be made, for example, by reacting a polyol such as glycerol with an alkylene oxide such as propylene oxide to form a hydroxy-terminated alkoxylated polyhydric alcohol, and then reacting the hydroxyl groups of the latter with a haloepoxy-substituted alkane such as epichlorohydrin to form the epoxide-terminated resin. The exemplified reaction may be written:

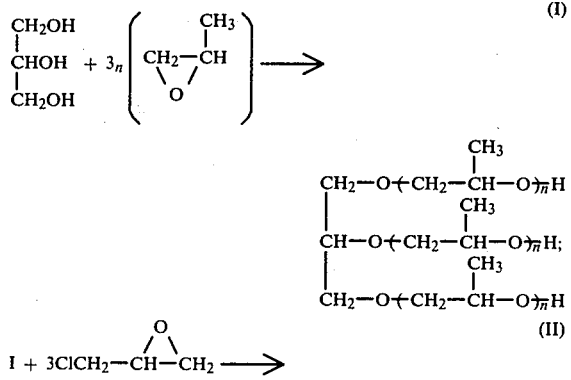

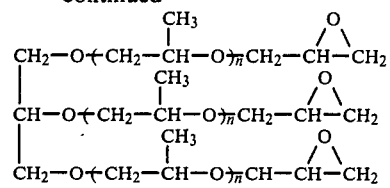

Reaction of the polyepoxide resin (II) through its epoxy groups with at least a stoichiometric quantity of an unsaturated organic acid such as methacrylic acid by well-known methods provides the plasticizing resin with terminal ethylenic unsaturation:

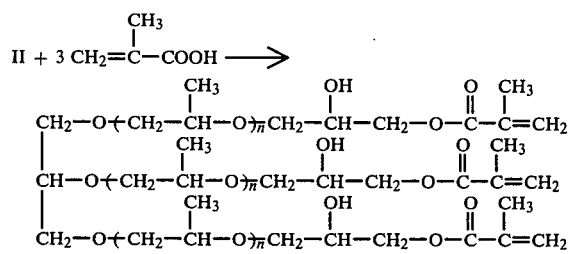

As mentioned above, the composition of the invention additionally preferably includes one or more ethylenically unsaturated monomers such as styrene, divinylbenzene, α-chlorostyrene, p-bromostyrene, t-butylstyrene, methyl methacrylate, 2,3-dibromomethyl methacrylate, etc. Low-viscosity liquid monomers, particularly styrene, are preferred. Styrene desirably is employed in the range of about 30%-40% by weight of the plasticized resin to improve resistance to alkaline materials such as NaOH. The amount and type of monomer employed, if any, normally will depend upon the end use of the resin composition. For example, dialkyl phthalate monomer may be employed to improve resistance of the resin to ketones such as acetone and methyl ethyl ketone. Since the terminal groups of both the resin and the plasticizer, and also the added monomer, have ethylenic unsaturation, the structure of the resulting, cured product may be varied considerably by varying the relative quantities of resin, plasticizer and monomer.

A significant feature of the invention is the surprisingly wide range of compatibility which has been found between the polyhydroxy polyester resin and the plasticizer. Another surprising feature involves the chemical resistance of the resulting product even when relatively high concentrations of plasticizer are employed. Improvements in mechanical strength and flexibility have been noted at plasticizer concentrations as low as 2.0 percent, and concentrations of up to 25 percent or more of plasticizer have been employed without noticeable deterioration of the resistance of the ultimate product to chemicals. The percentage figures herein refer to percentages by weight of plasticizer based on the total weight of plasticizer plus polyhydroxy polyester resin. Concentrations of plasticizer of up to 50 percent by weight have yielded useful products, although the preferred range of plasticizer concentration is from about 5 to about 25 percent by weight.

The invention may be more easily understood by reference to the following illustrative, non-limiting examples:

EXAMPLE I

A polyhydroxy polyester resin was prepared by reacting a commercial Bisphenol A-epichlorohydrin condensate (commonly known as an epoxy resin) having an epoxide equivalency of approximately 190 with Bisphenol A and methacrylic acid in a styrene monomer vehicle. The Bisphenol A was employed as a chain extender and in a quantity sufficient to raise the epoxide equivalent weight to about 550. The methacrylic acid was employed in slight excess so that the resultant resin was essentially free of unreacted epoxide groups.

To samples of the reaction product thus prepared were added varying quantities of a plasticizer formed by reacting "Epoxide 151", above-identified, with a slight excess of methacrylic acid so that the plasticizer was essentially free of unreacted epoxide groups. Additional styrene monomer was then added to the resulting product samples to adjust the vicosity of each to about 500 centipoises.

To each of the samples was added 1.0 part per hundred parts of resin by weight of benzoyl peroxide, and each of the samples was then formed and cured at 250° F. for one hour to form a one-eighth inch thick test specimen. The resulting specimens were subjected to testing in accordance with ASTM D 638-77a, and the results are reported in the following Table I:

TABLE I

| Plasticizer Concentration (1) | Tensile Strength, PSI | Elongation to Break, % |
|---|---|---|
| 0 | 11,500 | 5.5 |
| 10 | 10,000 | 10.1 |
| 20 | 8,000 | 21 |

The specimens were further tested for corrosion resistance to 20% NaOH, 25% H$_2$SO$_4$, and 10% NaOCl for a period of 30 days at 65° C. No significant loss in corrosion resistance properties due to incorporation of the plasticizer was noted.

EXAMPLE II

Equal parts by weight of the reactive plasticizer and the polyhydroxy polyester resin of Example I in a styrene monomer reactive diluent and with one percent (1%) of benzoyl peroxide added as a catalyst, were utilized in the formation of a two-inch filament wound pipe having a nominal wall thickness of 0.070 inches. The physical properties of the filament wound pipe were compared with those of an identical filament-wound pipe for which the reactive plasticizer component was omitted.

The parallel plate loading test of ASTM D 2412-76 was performed on each pipe. The percent deflection to the failure point was 30% for the pipe incorporating the reactive plasticizer, compared with 10% for the other pipe. Similarly, cyclic pressure testing in accordance with ASTM D 2143-69 was performed on each pipe sample. The number of cycles to failure at 1000 psi internal pressure for the pipe sample incorporating the reactive plasticizer was 45,000 cycles, compared with 7,000 cycles for the other pipe. Further, the falling ball impact resistance of the pipe incorporating the reactive plasticizer was four times that of the other pipe.

EXAMPLE III

Into a suitably heated and stirred reactor where charged six parts by weight of the Bisphenol A-epichlorohydrin epoxy resin referred to in Example I (as the polyhydroxy polyester resin precursor), five parts by weight of an aliphatic epoxide resin similar to the above-described Epoxide 151 but which is based upon propylene glycol as the polyol, the resin (DER-732, DOW Chem. Co.) having ether linkages in its backbone and having an epoxide equivalent weight of about 300 (as the reactive plasticizer precursor), and a slight excess of the stoichiometric amount of methacrylic acid required to react with all of the epoxide groups. The mixture was heated and stirred until the epoxide-methacrylic acid reaction was substantially complete, following which the mixture was cooled to room temperature and styrene monomer was added as a reactive diluent to provide the composition with a consistency suitable for application. To a small portion of the resulting composition was added one percent (1%) (based on resin plus monomer weight) of benzoyl peroxide, and the composition was then poured into a suitable specimen mold and cured at 250° for one hour to form a ⅛ inch thick test specimen. The test specimen provided physical and corrosion resistance properties similar to those reported in Example I above, and the ⅛ inch specimen could easily be flexed by hand without breakage.

As indicated by the data in Table I, above, the plasticizing effect (as reflected by ultimate elongation) of the plasticizer continuously increases as the concentration of the plasticizer increases. As a result, some plasticizing effect is noted at plasticizer concentrations as low as 2%. Because of the high level of compatibility of the plasticizer and the polyhydroxy polyester resin, the plasticizer may be employed at concentrations up to 50% or more.

The composition of the invention may be cured through the use of well-known free-radical initiators, such as various peroxides typlified by benzoyl peroxide, methyl ethyl ketone peroxide and t-butyl peroxide. The inclusion in the composition of plasticizer does not in any way appear to inhibit the curing characteristics of the composition. The composition may, of course, contain other adjuvants, e.g., fillers such as silica flour, clay, and the like.

While I have described a preferred embodiment of the present invention, it should be understood that various changes, adaptations, and modifications may be made therein without departing from the spirit of the invention and the scope of the appended claims.

What is claimed is:

1. A composition comprising the combination of
   (a) a polyester resin having ethylenically unsaturated terminal groups; and
   (b) a resinous reactive plasticizer of the formula

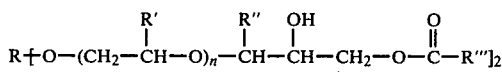

wherein R is the residue of an alkylene glycol, wherein R' and R" are individually H or lower alkyl, wherein each n is an integer of from 1 to 15, and wherein R''' is the radical of an α, β ethylenically unsaturated carboxylic acid of the formula R'''COOH.

2. A composition as in claim 1 wherein the reactive plasticizer is of the formula

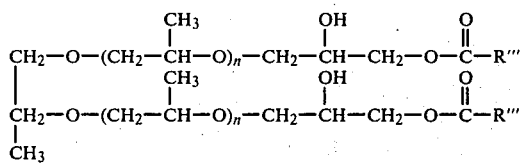

wherein each n is an integer of between from 6 to 10.

3. A composition as in claim 2 wherein the polyester resin is represented by the formula

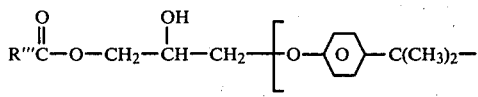

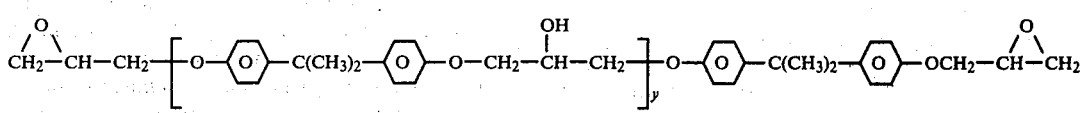

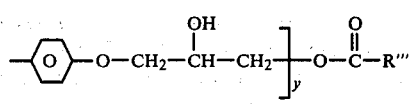

wherein R''' is the radical of an α, β ethylenically unsaturated carboxylic acid of the formula R'''COOH and y is an integer of from 1 to 20.

4. A composition as in claim 3 wherein the carboxylic acid is selected from the group consisting of acrylic acid, methacrylic acid, crotonic acid, isocrotonic acid, cinnamic acid, ethyl acrylic acid, propylacrylic acid, butylacrylic acid, maleic acid, and fumaric acid.

5. A composition as in claim 4 further comprising an amount of styrene monomer.

6. A composition as in claim 5 comprising from about 2 to about 50 weight percent of reactive plasticizer, based on the weight of polyester resin and reactive plasticizer combined.

7. A composition as in claim 6 wherein the carboxylic acid comprises methacrylic acid.

8. A process comprising reacting an α, β ethylenically unsaturated carboxylic acid having the formula R'''COOH with substantially all of the epoxide groups present in a mixture comprising a styrene-compatible polyester epoxide resin containing a plasticizing amount of a plasticizer precursor of the formula

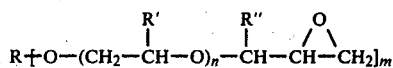

wherein R is the residue of an aliphatic polyol having the formula $R(OH)_m$, R' and R'' are individually H or lower alkyl, m is an integer of from 2 to 4, and n is an integer of from 1 to 15.

9. A process as in claim 8 wherein R is the residue of an alkylene glycol and m is 2.

10. A process as in claim 9 wherein R is the residue of propylene glycol and n is an integer of between from 6 to 10.

11. A process as in claim 10 wherein the polyester epoxide resin is represented by the formula

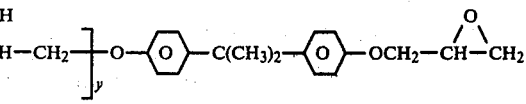

wherein Y is an integer of from 1 to 20.

12. A process as in claim 11 wherein the plasticizer precursor is represented by the formula

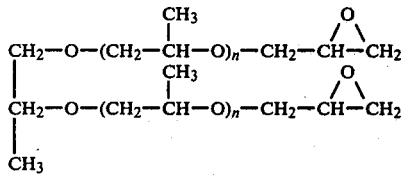

13. A process as in claim 12 wherein the carboxylic acid is selected from the group consisting of acrylic acid, methacrylic acid, crotonic acid, isocrotonic acid, cinnamic acid, ethylacrylic acid, propylacrylic acid, butylacrylic acid, maleic acid, and fumaric acid.

14. A process as in claim 13 wherein the carboxylic acid comprises methacrylic acid.

15. A process as in claim 14 wherein the mixture comprises from about 2 to about 50 weight percent of plasticizer precursor, based on combined weight of plasticizer precursor and polyester epoxide resin.

* * * * *